(12) United States Patent
Pruitt, Jr. et al.

(10) Patent No.: US 7,780,902 B2
(45) Date of Patent: Aug. 24, 2010

(54) METHOD OF MOLDING A SHOPPING CART

(75) Inventors: David L. Pruitt, Jr., Brookland, AR (US); Mark T. Ryan, Haskell, OK (US); Charles E. Shell, Jonesboro, AR (US); Robert D. Peota, Minneapolis, MN (US); Kenneth R. Crow, Northfield (GB); Matthew E. Sayer, Marlow (GB)

(73) Assignee: Target Brands, Inc., Minneapolis, MN (US)

( * ) Notice: Subject to any disclaimer, the term of this patent is extended or adjusted under 35 U.S.C. 154(b) by 751 days.

(21) Appl. No.: 11/650,232

(22) Filed: Jan. 5, 2007

(65) Prior Publication Data
US 2008/0164640 A1   Jul. 10, 2008

(51) Int. Cl.
B29C 49/06   (2006.01)
(52) U.S. Cl. .......................... 264/544; 264/259; 264/500
(58) Field of Classification Search ........................ None
See application file for complete search history.

(56) References Cited

U.S. PATENT DOCUMENTS

| | | |
|---|---|---|
| D156,702 S | 6/1948 | Danielson |
| D156,701 S | 1/1950 | Concklin |
| D188,841 S | 9/1960 | Umanoff |
| 2,997,311 A | 8/1961 | Umanoff |
| 3,048,420 A | 8/1962 | Umanoff |
| D198,448 S | 6/1964 | Moran |
| 3,346,271 A | 10/1967 | Parsons |
| 3,614,133 A | 10/1971 | Ganci et al. |
| D231,336 S | 4/1974 | Wahl |
| 3,999,774 A | 12/1976 | Rehrig |
| 4,046,394 A | 9/1977 | Thompson, Jr. |
| 4,065,142 A | 12/1977 | Rehrig |
| D247,953 S | 5/1978 | Rehrig |
| 4,106,887 A | 8/1978 | Yasuike et al. |
| 4,123,077 A | 10/1978 | Joseph |
| 4,129,635 A | 12/1978 | Yasuike et al. |
| 4,234,642 A | 11/1980 | Olabisi |
| 4,247,515 A | 1/1981 | Olabisi |
| 4,268,049 A | 5/1981 | Salvador |
| 4,273,346 A | 6/1981 | Rehrig |

(Continued)

FOREIGN PATENT DOCUMENTS

EP   0115439   1/1987

(Continued)

OTHER PUBLICATIONS

Hoover Universal Brochure, "Structural Web gives you quality finish at reduced cost." 1984.*

(Continued)

Primary Examiner—Monica A Huson
(74) Attorney, Agent, or Firm—Griffiths & Seaton PLLC

(57) ABSTRACT

A method of molding a shopping cart component includes providing a first subcomponent and then overmolding the shopping cart component as a second subcomponent about the first subcomponent. The first subcomponent acts as an obstacle to a plastic injection stream and to a gas injection stream during the overmolding of the second component to assist in defining a first hollow section of the shopping cart component adjacent the first subcomponent.

21 Claims, 8 Drawing Sheets

U.S. PATENT DOCUMENTS

| | | | |
|---|---|---|---|
| 4,286,795 A | 9/1981 | Rehrig | |
| 4,424,287 A | 1/1984 | Johnson et al. | |
| 4,478,344 A | 10/1984 | Rehrig | |
| D277,532 S | 2/1985 | Duhamel | |
| D283,264 S | 4/1986 | Levy-Joseph | |
| 4,632,411 A | 12/1986 | Badger | |
| 4,650,199 A | 3/1987 | Rehrig | |
| D294,419 S | 2/1988 | Rehrig | |
| 4,746,134 A | 5/1988 | Rehrig | |
| D296,259 S | 6/1988 | Rehrig | |
| 4,783,292 A | 11/1988 | Rogers | |
| 4,824,732 A | 4/1989 | Hendry et al. | |
| 4,922,639 A | 5/1990 | Rehrig | |
| 4,930,795 A | 6/1990 | Tannehill et al. | |
| 4,942,006 A | 7/1990 | Loren | |
| D311,983 S | 11/1990 | Rehrig | |
| D317,219 S | 5/1991 | Rehrig | |
| 5,013,032 A | 5/1991 | Baum et al. | |
| 5,015,166 A | 5/1991 | Baxi | |
| 5,054,689 A | 10/1991 | Hunerberg et al. | |
| 5,098,267 A | 3/1992 | Cheng | |
| 5,098,637 A * | 3/1992 | Hendry | 264/328.12 |
| 5,112,563 A | 5/1992 | Baxi | |
| 5,151,278 A | 9/1992 | Baxi et al. | |
| 5,203,578 A | 4/1993 | Davidson et al. | |
| 5,204,051 A | 4/1993 | Jaroschek | |
| 5,225,141 A | 7/1993 | Hendry | |
| 5,255,930 A | 10/1993 | Jones et al. | |
| D343,711 S | 1/1994 | Craft et al. | |
| D359,828 S | 6/1995 | Lindberg | |
| 5,423,667 A | 6/1995 | Jaroschek | |
| 5,441,288 A | 8/1995 | Rehrig | |
| 5,458,347 A | 10/1995 | Chiv | |
| 5,531,581 A | 7/1996 | Donnell, Jr. | |
| 5,544,904 A | 8/1996 | Mather | |
| 5,553,877 A | 9/1996 | Huang | |
| D377,255 S | 1/1997 | Rehrig | |
| 5,613,696 A | 3/1997 | de Luna | |
| 5,707,659 A | 1/1998 | Erikson | |
| 5,769,435 A | 6/1998 | Nishida | |
| 5,770,237 A | 6/1998 | Sayer et al. | |
| 5,791,666 A | 8/1998 | Mainard | |
| D400,679 S | 11/1998 | Kern et al. | |
| 5,836,596 A | 11/1998 | Wanzl | |
| 5,865,448 A | 2/1999 | Kern et al. | |
| 5,871,286 A | 2/1999 | Kern et al. | |
| D411,264 S | 6/1999 | Huang | |
| 5,915,704 A | 6/1999 | Segura de Luna | |
| D412,046 S | 7/1999 | Rehrig et al. | |
| 5,947,313 A | 9/1999 | Kern et al. | |
| 5,961,133 A | 10/1999 | Perry | |
| 6,029,380 A | 2/2000 | Goddard | |
| D426,365 S | 6/2000 | Rehrig et al. | |
| 6,075,113 A | 6/2000 | Masterman et al. | |
| 6,186,382 B1 | 2/2001 | Bergin et al. | |
| D444,281 S | 6/2001 | Gaze | |
| 6,336,249 B1 | 1/2002 | Plumley | |
| D466,301 S | 12/2002 | Sofy | |
| 6,579,489 B1 | 6/2003 | Thomas | |
| 6,589,458 B2 * | 7/2003 | DeCost | 264/50 |
| 6,736,415 B1 | 5/2004 | Lenihan | |
| 6,749,204 B2 | 6/2004 | Werner | |
| 6,761,364 B2 | 7/2004 | Murar et al. | |
| 6,767,487 B2 | 7/2004 | Pearson | |
| 6,827,895 B1 * | 12/2004 | Yamamoto | 264/266 |
| 6,896,844 B2 | 5/2005 | Thomas | |
| 6,953,546 B2 | 10/2005 | Pearson | |
| 6,966,566 B2 | 11/2005 | Duchene et al. | |
| 6,981,708 B1 | 1/2006 | Tucker et al. | |
| 6,983,944 B2 | 1/2006 | Bergia | |
| D530,478 S | 10/2006 | Splain | |
| D540,998 S | 4/2007 | Splain et al. | |
| D546,021 S | 7/2007 | Splain et al. | |
| 7,237,782 B2 | 7/2007 | Tucker et al. | |
| D550,423 S | 9/2007 | Splain et al. | |
| D556,413 S | 11/2007 | Splain et al. | |
| 2002/0135144 A1 | 9/2002 | Murar et al. | |
| 2003/0116933 A1 | 6/2003 | Nadeau et al. | |
| 2003/0151217 A1 | 8/2003 | Trubiano | |
| 2004/0046341 A1 | 3/2004 | Wilkinson | |
| 2004/0104549 A1 | 6/2004 | Bergia | |
| 2005/0103797 A1 | 5/2005 | Rader et al. | |
| 2005/0189360 A1 | 9/2005 | Loucks et al. | |

FOREIGN PATENT DOCUMENTS

| | | |
|---|---|---|
| WO | 9302903 | 2/1993 |
| WO | 9604161 | 2/1996 |

OTHER PUBLICATIONS

Dave Anderson et al., "Structural Web Molding", A New Development in Low Pressure Smooth Surface Technology, Hoover Universal, pp. 48-56. 1982.*

John Heasman, "Cinpres-gas-assisted injection molding", Cinpres Limited, pp. 108-110. Admitted prior art, undated.*

"Cinpress Gas-Injection Case Study", Cinpress Ltd. Brochure. Admitted prior art, undated.*

Article, "Nitrojection Process Description and Advantages", Sajar Plastics, Inc. Admitted prior art, undated.*

"Engineering and Processing News", Modern Plastics, Mar. 1980, pp. 22, 24.

Edward Mason, "Gas Injection Offers New Opportunities", Canadian Plastics, Nov./Dec. 1988, pp. 42-43.

"Two Breakthroughs in Smooth Surface Finish for Structural Foam . . . ", Injection Molding News Brief, vol. VIII, No. 43, Oct. 24, 1979.

Cashiers' Pressure Process, A Revolutionary Development in Structural Foam Molding, Cashiers Plastic, Oct. 1981.

Steve Ham, "Structural Plastics, Fundamentals of Structural Plastics", Plastics Engineering, Jun. 2001, pp. 46-57.

Article, "New Structural Form Injection Molding With Swirl-Free Smooth Surface and Uniform Solid Skin", Asahi-Dow Limited, 1981.

U.S. Appl. No. 11/231,313, filed Sep. 19, 2005, and entitled "Seat Assembly for a Shopping Cart".

U.S. Appl. No. 11/231,343, filed Sep. 19, 2005, and entitled "Shopping Cart Handle".

U.S. Appl. No. 11/231,344, filed Sep. 19, 2005, and entitled "Shopping Cart Base".

U.S. Appl. No. 11/231,364, filed Sep. 19, 2005, and entitled "Shopping Cart Basket".

U.S. Appl. No. 29/280,573, filed May 31, 2007, and entitled "Shopping Cart".

U.S. Appl. No. 29/296,975, filed Oct. 31, 2007, and entitled "Shopping Cart".

* cited by examiner

US 7,780,902 B2

METHOD OF MOLDING A SHOPPING CART

BACKGROUND OF THE INVENTION

Shopping carts have become very important in Western culture. Stores around the world maintain fleets of shopping carts to facilitate a customer's selection, transport, and purchase of goods within those stores. Over many decades, the shape and size of shopping carts have changed to meet different models of shopping. However, in recent history, the basic shopping cart has changed very little, except for the application of different materials such as plastics.

Retailers devote considerable resources to shaping a customer's experience within a retail store to make shopping easier, more comfortable, and attractive. Unfortunately, very little of this attention has been placed on the shopping cart. Accordingly, shopping carts remain generally heavy, bulky, and difficult to maneuver. Conventional shopping carts are constructed to be rugged to withstand weather, misuse, and rough handling during use, collection and storage. Unfortunately, this attention to ruggedness has produced a cart with a steel chassis and handles, sometimes having rough edges and/or relatively sharp corners. These steel components contribute to the stodgy feel and unattractive appearance of many conventional shopping carts.

Given their high profile in the retail environment and their impact on the experience of the consumer, shopping carts should better serve to meet the needs and wants of consumers, especially in fast-moving, retail cultures.

BRIEF DESCRIPTION OF THE DRAWINGS

Embodiments of the invention will be described with respect to the figures, in which like reference numerals denote like elements, and in which.

DETAILED DESCRIPTION

Figure 1:
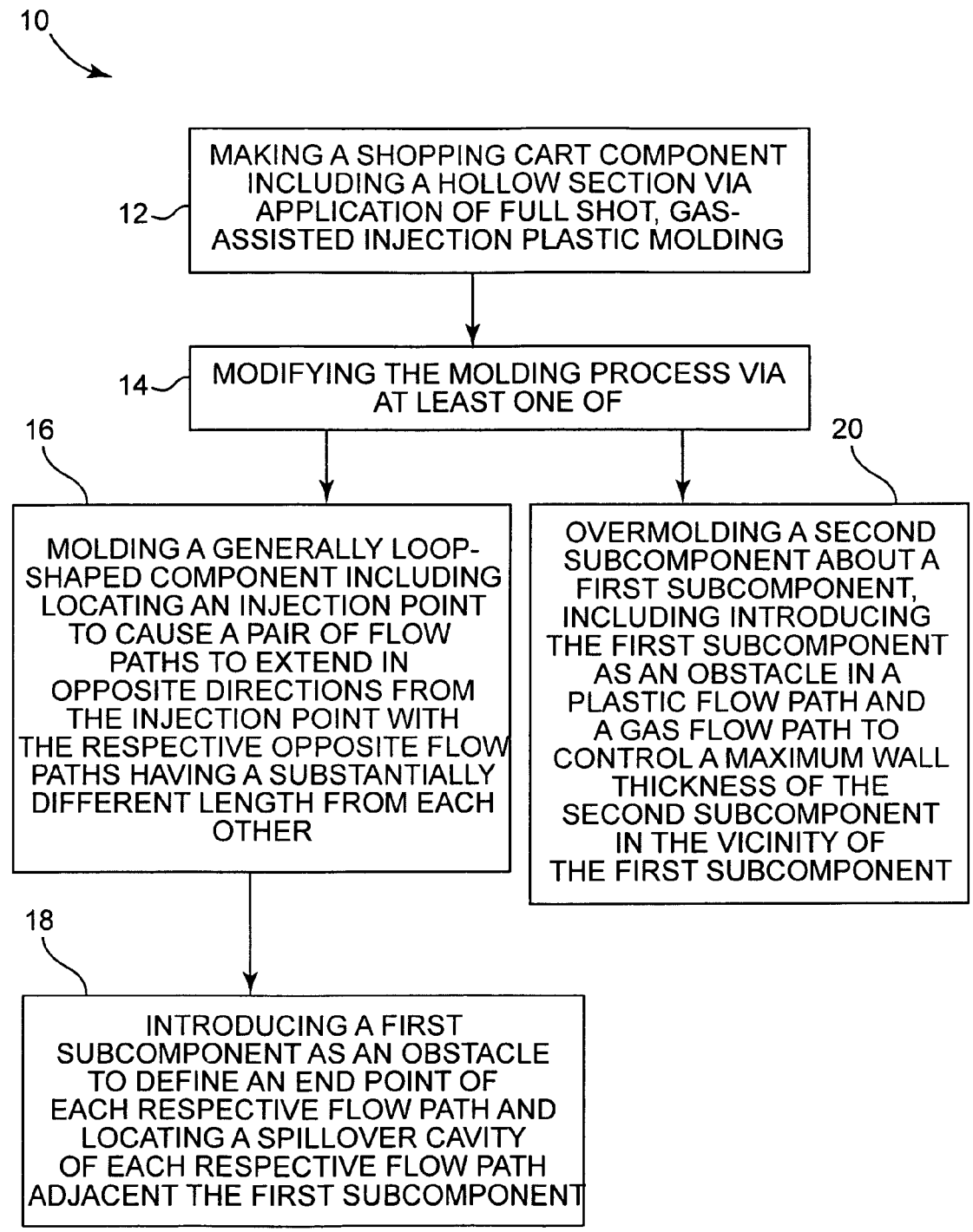
FIG. 1 is a flow diagram of a method of molding a shopping cart, according to an embodiment of the invention.

In the following detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Embodiments of the invention are directed to a method of molding a product. In one aspect, the method is directed to molding a shopping cart component and comprises providing a first subcomponent and then overmolding the shopping cart component (as a second subcomponent) about the first subcomponent. In one aspect, the first subcomponent is introduced as an obstacle in a plastic injection flow path and a gas flow path during the overmolding of the shopping cart component to define a first hollow section of the shopping cart component adjacent the first subcomponent.

In one aspect, the first subcomponent is an already-molded component that is molded prior to its introduction during the molding of the shopping cart component. In another aspect, the first subcomponent is formed via mechanisms other than molding.

In another aspect, via use of the first subcomponent, the first hollow section of the overmolded shopping cart component comprises a wall thickness that is limited to and that generally corresponds to a wall thickness of a second hollow section of the shopping cart component.

Embodiments of the invention enable molding relatively large and complex components of a shopping cart, such as a basket, that includes hollow sections while limiting a wall thickness in the hollow sections from exceeding a maximum wall thickness. These embodiments facilitate proper filling of molten plastic into a mold and facilitate proper gas-assist flow during formation of the relatively larger hollow sections of the shopping cart component while simultaneously maintaining optimal curing and minimal shrinkage of the plastic in the mold for those larger hollow sections. In one embodiment, the first subcomponent comprises an insert member sized and shaped to occupy and define a substantial volume of a large sized portion of a molded component. The insert member adds strength to the large sized portion and facilitates molding by: (1) effectively reducing the volume that the molten plastic has to fill in that portion of the molded component; and (2) effectively reducing the volume of plastic that must be displaced by gas injection to maintain a desired wall thickness in hollow sections of the molded component that will be generally consistent with the wall thicknesses of other hollow sections of the molded shopping cart component that are remote from the insert member.

In one embodiment of the invention, the insert member comprises a hollow sleeve that is sized and shaped to receive an insertable prong of a second, different shopping cart component (e.g. a wheeled base) and/or that is sized and shaped to receive an insertable prong of a third, different shopping cart component (e.g., a handle).

Accordingly, one embodiment of the invention includes an insert member (e.g., a hollow sleeve) that greatly simplifies the molding of an all-plastic shopping cart component, such as a basket of a shopping cart, by reducing the volume of molding of a hollow section of the basket in the region adjacent the position of the insert member.

In another embodiment of the invention, a handle of a shopping cart is molded via full shot, gas-assisted injection molding. In one aspect, a first subcomponent comprises a solid plug and the second overmolded subcomponent comprises a handle of a shopping cart. In this embodiment, the solid plug acts as an obstacle to a plastic flow path and a gas flow path during molding of the handle to facilitate formation of a hollow structure of the handle.

These embodiments, and additional embodiments, are described in association with FIGS. 1-11.

FIG. 1 is a flow diagram of a method 10 of molding a shopping cart component, according to an embodiment of the invention. As shown in FIG. 1, at block 12 method 10 comprises making a shopping cart component that includes a hollow section via application of a full shot, gas-assisted plastic injection molding process. In one aspect, this injection molding process is a full-shot process in which the mold is completely filled with molten plastic prior to any injection of gas. Upon injection of a gas into the completely filled mold, a generally centrally axial portion of the molten plastic in the mold is expelled (via the force of gas) from the mold into a spillover well to produce a hollow section of the shopping cart component. At block 14, method 10 comprises modifying the molding process.

In one embodiment, at block 20 the method 10 includes the shopping cart component comprising a first subcomponent and modifying the molding process via overmolding a second subcomponent about the first subcomponent. In particular, this modification includes introducing the first subcomponent as an obstacle in a plastic flow path and in a gas flow path to control a maximum wall thickness of the second subcomponent in the vicinity of the first subcomponent. In one aspect, the method limits the wall thickness of the first hollow section from exceeding a predetermined maximum wall thickness of the shopping cart component. In another aspect, the wall thickness of the first hollow section generally corresponds to a wall thickness of other hollow sections of the shopping cart component. In one embodiment, the first subcomponent comprises an insert member defining a generally hollow sleeve.

This embodiment and additional embodiments are described in association with FIGS. 6-11.

In another embodiment, at block 16 method 10 comprises molding a generally loop-shaped component of a shopping cart to produce a generally hollow channel throughout the generally loop-shaped component. In one aspect, this generally loop-shaped component comprises a handle of a shopping cart.

In another embodiment, molding the generally loop-shaped component additionally includes locating a plastic injection point and/or a gas injection point at a "non-exposed" portion of the generally loop-shaped component. In one aspect, this "non-exposed" portion generally corresponds to a portion of the shopping cart component that will not be visible or exposed to the environment upon incorporation of the component into fully assembled shopping cart.

In one embodiment, the location of the injection point is adjacent a rear corner of the generally rectangular, loop-shaped component. In one aspect, this "rear-corner" location of the injection point(s) causes the plastic flow paths during molding to extend in opposite directions from the injection point with the oppositely oriented plastic flow paths extending substantially about the generally loop-shaped component and with an end point of each respective plastic flow path being located adjacent a front portion of the generally rectangular, loop-shaped component. Similarly, in another aspect, this "rear-corner" location of the injection point(s) causes the gas flow paths during molding to extend in opposite directions from the injection point with the oppositely oriented gas flow paths extending substantially about the generally loop-shaped component and with an end point of each respective gas flow path being located adjacent a front portion of the generally rectangular, loop-shaped component. Accordingly, in one aspect, the respective oppositely-oriented, plastic flow paths have a substantially different length relative to one another which results in a generally asymmetric plastic flow path and the respective oppositely-oriented, gas flow paths have a substantially different length relative to one another which results in a generally asymmetric gas flow path for the molding process.

In another embodiment, at block 18 method 10 comprises additionally introducing a first subcomponent (e.g., a plug) as an obstacle to define the end point of each respective plastic flow path and gas flow path, and to define a location of a spillover well for each respective plastic flow path and gas flow path. In other words, the end point of each respective plastic flow path and gas flow path generally corresponds to a location of a spillover well configured to receive molten plastic expelled via the gas flow. In one aspect, the spillover well is located adjacent the front portion of the generally rectangular, loop-shaped component to be at a generally opposite end of the molded generally loop-shaped component relative to the injection points of the plastic flow paths and the gas flow paths. This embodiment, among additional embodiments, is further described in association with FIGS. 2-5.

Figure 2:
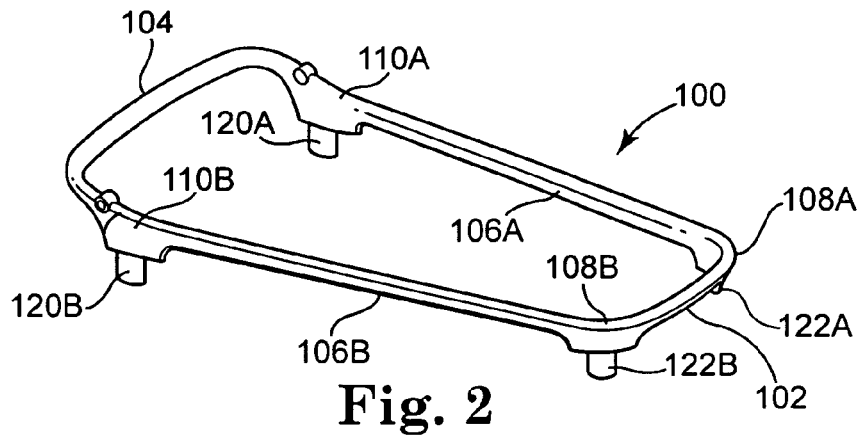
FIG. 2 is a perspective view of a handle of a shopping cart, according to an embodiment of the invention.

FIG. 2 is an isometric view of a handle 100 mountable at an upper portion of a basket of a shopping cart, according to an embodiment of the invention. As shown in FIG. 2, in one embodiment, handle 100 comprises front portion 102, rear portion 104, side portions 106A, and 106B, as well as front corner portions 108A, 108B and rear corner portions 110A, 110B. In one aspect, handle 100 defines generally loop-shaped member defining a substantially continuous loop. In another aspect, the handle 100 has a size and shape that substantially matches a size and shape of a mouth of a basket (such as basket 250 in FIG. 6). In one aspect, the shape of the substantially continuous loop of handle 100 is a generally rectangular shape. In another aspect, handle 100 defines a generally hollow structure extending substantially throughout the handle 100 and having substantially the same features and attributes as the hollow structure later described and illustrated in association with FIG. 8.

Figure 5:
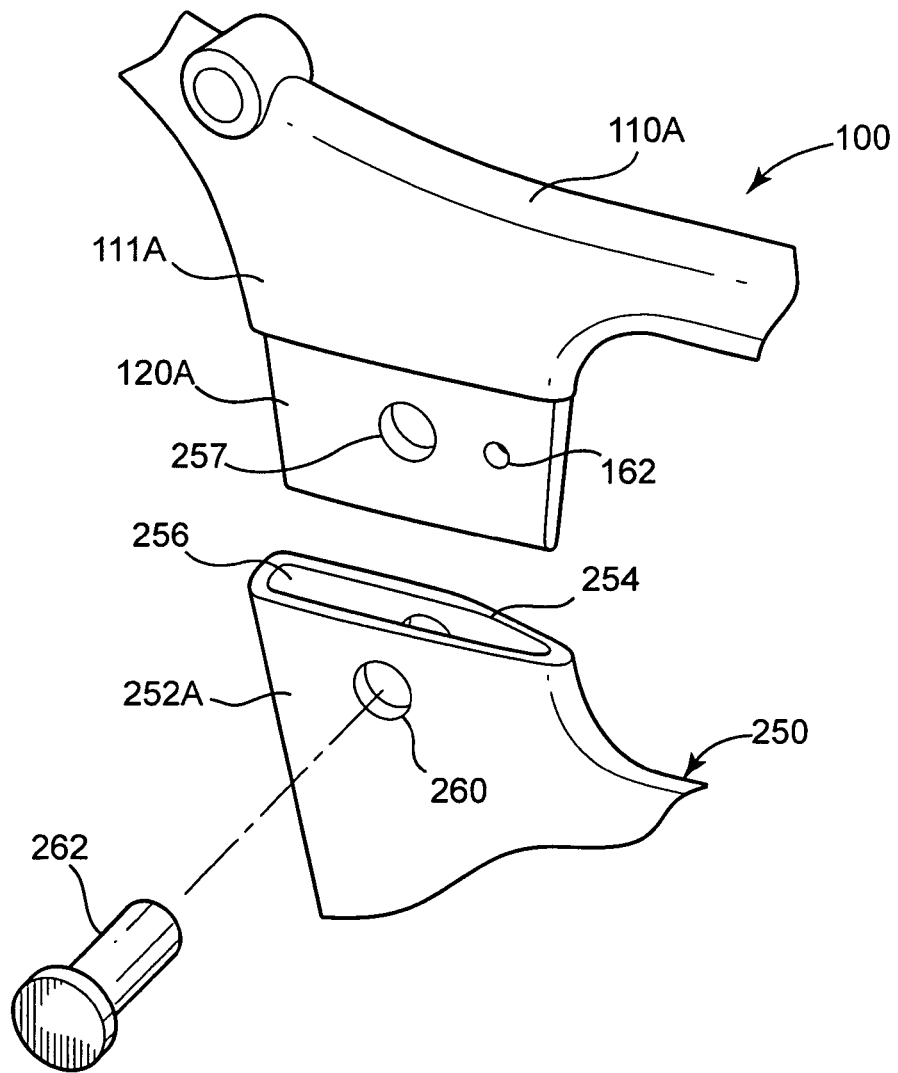
FIG. 5 is an enlarged exploded perspective view illustrating assembly of a handle and a basket of the shopping cart, according to an embodiment of the invention.

In one aspect, each rear corner portion 110A, 110B of handle 100 comprises a prong (or connecting portion) 120A, 120B, respectively, extending downward for attachment relative to a basket of a shopping cart, as further described in association with FIG. 5. Each front corner portion 108A, 108B of handle 100 comprises a prong (or connecting portion) 122A, 122B, respectively, extending downward for attachment relative to a basket of a shopping cart.

Figure 3A:
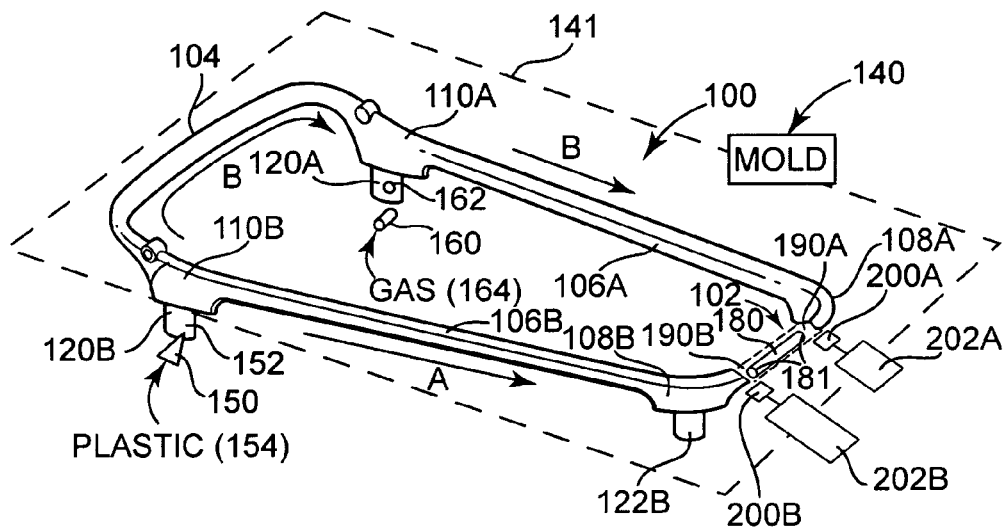
FIG. 3A is a perspective view illustrating injecting a molten plastic in a method of molding a handle of a shopping cart, according to an embodiment of the invention.
Figure 3B:
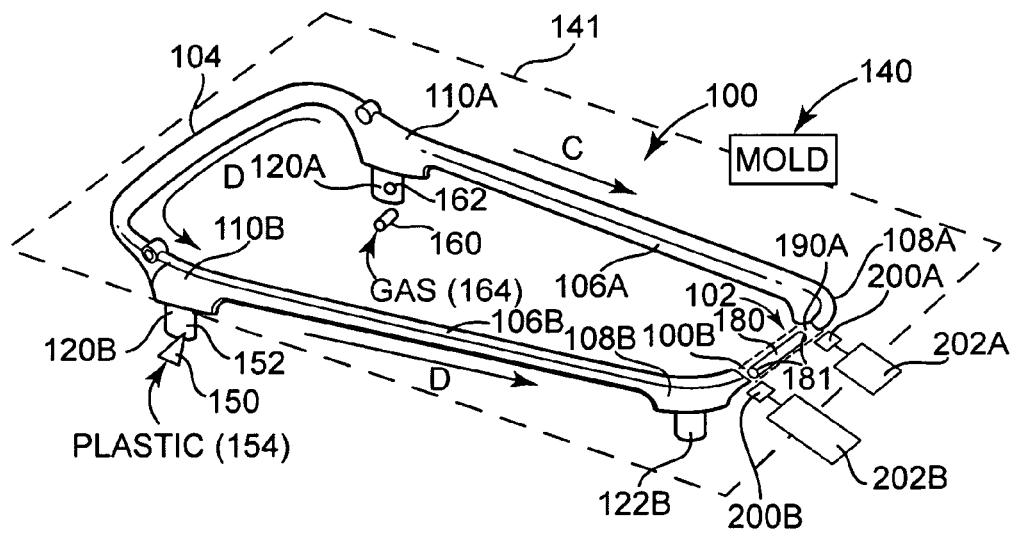
FIG. 3B is a perspective view illustrating injecting a gas in a method of molding a handle of a shopping cart, according to an embodiment of the invention.

FIG. 3A is a schematic illustration of injecting a molten plastic into a mold in a method of molding a handle 100 of a shopping cart, according to an embodiment of the invention, while FIG. 3B schematically illustrates injecting a gas into the molten plastic within the mold to form a hollow section within the handle of the shopping cart, according to an embodiment of the invention.

As shown in FIG. 3A, handle 100 is formed via a molding mechanism 140 within a mold that is schematically represented by dashed lines 141 for illustrative clarity. Those skilled in the art will be cognizant of a geometric configuration appropriate for mold 141 to form a generally rectangular loop-shaped component such as handle 100. As further shown in FIG. 3A, a plastic injection point 152 is located on mold 141 at the prong 120B of handle 100 adjacent corner portion 110B of handle 100. In one aspect, prong 120B corresponds to a portion of handle 100 sized and shaped for insertion to a receiving slot of a basket (e.g., basket 250 in FIGS. 6-7) of a shopping cart so that the prong 120B of handle 100 becomes a non-exposed portion of a fully assembled shopping cart. In this aspect, this non-exposed portion of handle 100, which includes prong 120B and plastic injection point 152, will not be seen by a consumer using an assembled shopping cart. In another aspect, this non-exposed portion of handle 100 that includes prong 120B and plastic injection point 152 also will not be exposed to the elements such as rain, snow, dirt, etc, thereby prolonging the life of the cart.

In one embodiment, handle 100 is molded by injecting molten plastic 154 into mold 141 at injection point 152 via a gate 150. Upon injection of the molten plastic 154 into mold 141 under pressure, the molten plastic 154 first travels in a path of least resistance (as indicated by directional arrow A in FIG. 3A), which generally corresponds to the formation of side portion 106B and corner portion 108B of handle 100. In one aspect, molten plastic 154 flows along path A in mold 141 to end point 190B where plug 180 substantially blocks the flow of the molten plastic 154 to facilitate complete filling of the molten plastic 154 to form side portion 106B and corner 108B of handle 100 in mold 141. In other aspects, as described later, plug 180 provides additional functions during the molding of handle 100.

In another aspect of molding handle 100, with side portion 106B and corner portion 108B of handle 100 within mold 141 completely filled with molten plastic 154, additional molten plastic 154 continues to be injected into mold 141 via gate 150. In this aspect, as additional molten plastic 154 is injected, molten plastic 154 flows in the next path of least resistance within mold 141, which is indicated by directional arrow B in FIG. 3A. Accordingly, the molten plastic 154 flows in the opposite direction (relatively to the already filled portion of the mold 141) to fill and form rear portion 104, side portion 106A, and corner portion 108A of handle 100 within mold 141 until the molten plastic 154 is substantially blocked by plug 180 adjacent end point 190A at front portion 102 of handle 100. Upon complete filling of molten plastic within the mold 141 to form handle 100, gate 150 is closed to terminate injection of plastic 154 into molding mechanism 140.

Because handle 100 is a generally loop-shaped member, molten plastic 154 that is injected at a single location (e.g., injection point 152) into mold 141 will flow along two oppositely oriented flow paths (A and B) that would eventually meet each other were plug 180 not present in mold 141. Accordingly, plug 180 is placed at a location in the mold 141 to prevent the two opposite flow paths of molten plastic 154 from flowing into each other. Moreover, because a later-described aspect of the method of molding the handle 100 includes using gas to expel a portion of the plastic from mold 141, plug 180 also provides an end point at which the excess plastic will be expelled (via gas injection) into a spillover well, as later described in association with FIG. 3B.

Figure 4:
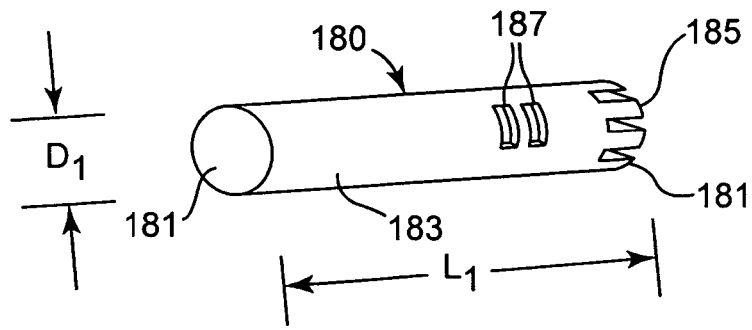
FIG. 4 is an enlarged perspective view of an insert member used in a method of molding a handle of a shopping cart, according to an embodiment of the invention.

FIG. 4 is a perspective view of a plug 180, according to an embodiment of the invention. As shown in FIG. 4, plug 180 comprises an elongate, generally cylindrical insert member having a body 183 extending between ends 181, although plug 180 is not restricted to a cylindrical shape. In one aspect, plug 180 comprises a ribbed portion 185 formed adjacent one or more of the ends 181 of plug 180. In another aspect, plug 180 comprises a ribbed portion 187 formed on body 183 of plug 180. Both ribbed portion 185 and ribbed portion 187 are sized and shaped to encourage flow of molten plastic into and around of the ribs of the respective ribbed portion(s) 185, 187 so that upon hardening of the molten plastic, a mechanically interlocked arrangement is formed between the ribbed portion(s) 185, 187 and the plastic forming the remainder of the front portion 102 of handle 100. However, the solidification of the molten plastic to "lock-in" plug 180 occurs after complete filling of the mold 141 and after expulsion of excess plastic via gas injection, as described in association with FIGS. 3A and 3B, respectively.

In another aspect, plug 180 has a reduced diameter D1 that is slightly less than a diameter of a cross-section of the fully molded front portion 102 of handle 100 (FIG. 2). Accordingly, when plug 180 is placed in mold 141, this reduced diameter D1 enables a small amount of molten plastic 154 to flow about the entire body 183 of plug (in addition to the flowing into the ribbed portions 185, 187) to overmold the front portion 102 of handle 100 about the plug 180. However, the diameter D1 is large enough, and therefore the gap between the wall of the mold 141 (at front portion 102 of handle 100) and body 183 of plug 180 small enough so that gas injected into molten plastic 154 will not displace the molten plastic surrounding body 183 of plug 180 within mold 141. Accordingly, with this overmolding of front portion 102 about plug 180, plug 180 is not visible in a front portion 102 of a fully molded handle 100, as shown in FIG. 2.

In one aspect, plug 180 comprises a plastic material, such as a nylon material, a high density polyethylene material, or another thermoplastic material. In another aspect, portions 185 and 187 of plug 180 are not strictly limited to a ribbed structure but can alternatively comprise a latticework, fingers, or other structure(s) adapted to encourage locking of the plug 180 relative to the injected plastic (in the remainder of front portion 102 of the handle 100 within the mold 141) during the overmolding of the plug 180 within the front portion 102 of the handle 100.

In one aspect, plug 180 acts as an already-molded first subcomponent about which the handle 100 (e.g., a second component) is molded and in which the plug 180 acts as an obstacle to the plastic flow paths A, B (as described and illustrated in association with FIG. 3A) and as an obstacle to the gas flow paths C, D (as will be described and illustrated in association with FIG. 3B). Accordingly, the plug 180 acts to control both the plastic flow and/or the gas flow by limiting filling of the molten plastic and facilitating outflow of the excess molten plastic during gas injection as described below.

FIG. 3B is a perspective view schematically illustrating gas-assist injection in a method of molding a shopping cart, according to an embodiment of the invention. As shown in FIG. 3B, molding mechanism 140 includes a gas injection point 162 that is located on mold 141 in a position adjacent to the formation of prong 120A of handle 100 (below corner portion 110A). In one aspect, prong 120A corresponds to a portion of handle 100 to be inserted to a receiving slot of a basket of a shopping cart so that the prong 120A becomes a non-exposed portion of a fully assembled shopping cart. In this aspect, prong 120A, and therefore gas injection point 162 will not be seen or felt by a consumer using the shopping cart and will also not be exposed to the elements such as rain, snow, dirt, etc which commonly occurs with shopping carts. This arrangement is further illustrated later in association with FIG. 5.

In one aspect, with mold 141 completely filled with molten plastic 154, a gas 164 (such as nitrogen) is injected into mold 141 at injection point 162 via a nozzle 160. Upon injection of the gas 164 into the molten plastic 154 within the mold 141, the gas first travels in a path of least resistance (as indicated by directional arrow C), which generally corresponds to travel through the completely plastic-filled side portion 106A and corner portion 108A of handle 100 within mold 141. In one aspect, as gas 164 flows along path C within filled mold 141 to end point 190A of molding mechanism 140, the gas forces molten plastic 154 out of a generally central axial portion of the molten plastic 154 in mold 141 to form a hollow channel within the molten plastic 154, with the gas further pushing excess molten plastic out of mold 141 through spillover well 202A (via gate 200A) adjacent plug 180 at end portion 190A of molding mechanism 140.

In another aspect, with the gas remaining in side portion 106A and corner portion 108A, the molten plastic then flows in the next path of least resistance through mold 141 (as indicated by directional arrow D) wherein the gas travels from the injection point 162 through the molten plastic 154 within the completely filled rear portion 104, side portion 106B, and corner portion 108B of handle 100 within mold 141. As the gas travels through the molten plastic 154, the gas pushes out a generally central axial portion of the molten plastic 154 to form a hollow center within the rear portion 104, side portion 106B and corner portion 108B of the handle 100 within mold 141 until the gas forces the excess molten plastic 154 out of mold 141, adjacent plug 180 at end portion 1 90B, into spillover well 202B via gate 200B. In one aspect, plug 180 is located immediately adjacent spillover wells 202A, 202B and terminates the gas flow paths C, D to facilitate expulsion of excess molten plastic resulting from the formation of the hollow channel in the handle 100. At this point, injection of gas into mold 141 is discontinued.

In one embodiment, because of the asymmetric arrangement of the different lengths of gas flow paths C and D, the respective spillover wells 202A, 202B each have a different size to accommodate the different volume of plastic expelled from the respective different lengths of the gas flow paths C and D. In particular, spillover well 202B has a substantially greater volume than spillover well 202A because of the substantially greater length (and therefore substantially great volume) of gas flow path D relative to gas flow path C.

Accordingly, completion of the plastic injection and gas injection aspects of the method results in a molded handle 100 having a gas, filled hollow channel through substantially the entire generally rectangular, loop shape of the handle 100 (e.g., rear portion 104, side portions 106A, 106B, and front corner portions 108A, 108B), except for the solid plug 180 within the front portion 102 of handle 100. In one embodiment, this hollow channel within handle 100 is substantially similar to the appearance of the hollow channel structure illustrated later in association with FIG. 8, except not being strictly limited to the shape shown in FIG. 8. Finally, this hollow structure provides strength for handle 100 with much less weight and material cost than a solid, molded handle.

In one embodiment, a method of molding handle 100 as described above in association with FIGS. 2, 3A-3B, and 4 includes the use of additional parameters and aspects of gas-assisted plastic injection molding, as known to those skilled in the art, to accomplish a full-shot, gas-assisted plastic injection molding. In one aspect, the method of molding handle 100 employs a plastic expulsion process made available from Cinpres Gas Injection Limited of United Kingdom. In another embodiment, other injection molding systems and methods are employed for constructing the hollow structure and/or for constructing non-hollow portions of base 300, basket 250, and/or handle 100. In one aspect, other employable gas-assisted molding processes include those processes made available by GAIN Technologies, Inc. of Michigan in the United States.

In another aspect, handle 100 is formed from a plastic material such as a nylon material, a high density polyethylene material, or another thermoplastic material.

FIG. 5 is a partial perspective view illustrating assembly of handle 100 relative a portion of basket 250 (FIGS. 6-7), according to one embodiment of the invention, to further illustrate the manner in which the gas injection point and/or plastic injection point is located on a non-exposed portion (e.g., prong 120A or prong 120B) of an assembled shopping cart. As shown in FIG. 5, rear corner portion 110A of handle 100 comprises downwardly protruding extension 111A with prong 120A. In one embodiment, basket 250 comprises connecting portion 252A (extending generally upward from a rear upright frame member 272A of basket 250 as later shown in FIGS. 6-7) that defines slot 256 formed by side wall 254 so that slot 256 provides an upper slot of basket 250. As shown later in FIG. 7, connecting portion 252B provides a substantially similar structure as connecting portion 252A.

In one embodiment, prong 120A of handle 100 is adhesively secured within slot 256 of connecting portion 252A to permanently secure handle 100 relative to basket 250. In another embodiment, prong 120A of handle 100 comprises one or more holes 257 that extend transversely through prong 120A and connecting portion 252A of basket 250 comprises hole(s) 260 extending through sidewall 254. In one aspect, respective holes 257, 260 are sized and positioned on the respective prong 120A and connecting portion 252A of basket 250 to align with each other when prong 120A of handle 100 is fully inserted into slot 256 of connecting portion 252A of basket 250 to form a matched hole for receiving a securing pin 262 that is slidably insertable into the respective holes 257, 260. Accordingly, with this arrangement shown in FIG. 5, the gas injection point 162 on handle 100 will be concealed from sight or touch from the consumer and sealed away from the elements such as rain, wind, dirt, etc. A substantially similar arrangement at corner portion 110B of handle 100 and connecting portion 252B of basket 250 (FIG. 6) conceals plastic injection point 152 on prong 120B of handle 100 within a non-exposed portion of a fully assembled shopping cart.

In another embodiment, a method of molding a component of a shopping cart comprises providing a first subcomponent to assist in the overmolding of a second subcomponent to achieve a target hollow structure, via gas-assisted injection, for a component of a shopping cart. FIGS. 6-10F illustrate embodiments of the invention directed to employing a method of molding to form a basket of a shopping cart having one or more large hollow sections.

Figure 6:
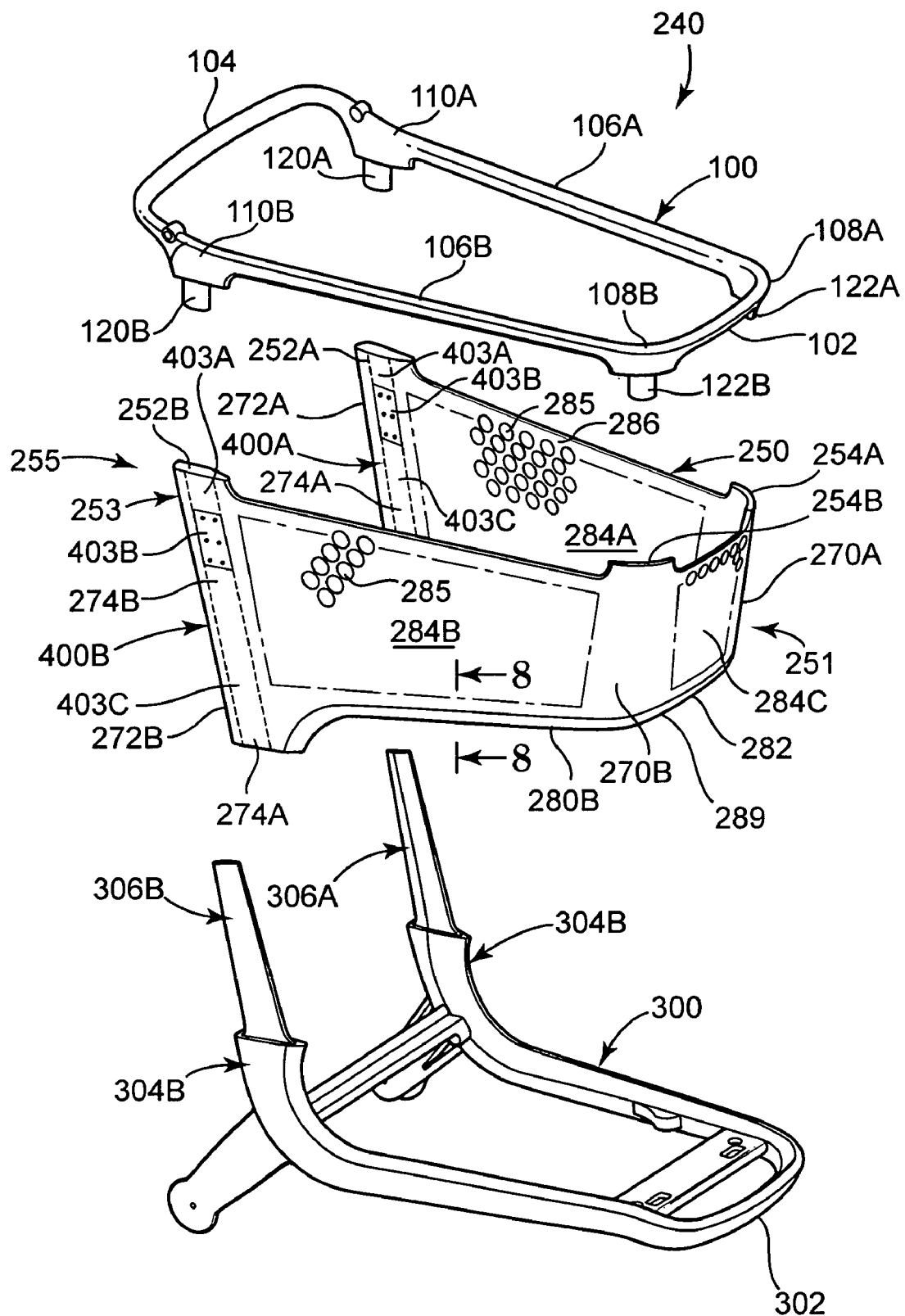
FIG. 6 is an exploded assembly view of a handle, a basket, and a wheeled base of a shopping cart, according to an embodiment of the invention.

FIG. 6 is an exploded, perspective view generally illustrating a shopping cart, according to an embodiment of the invention. As shown in FIG. 6, in one embodiment, shopping cart 240 comprises handle 100, basket 250, and base 300. Handle 100 is mountable at an upper portion of basket 250, as previously described in association with FIG. 5. Basket 250 defines a container for carrying items while base 300 supports basket 250 and is configured to carry an array of wheels for locomotion of the shopping cart 240. In one aspect, basket 250 includes a front portion 251 and a rear portion 255.

Figure 7:
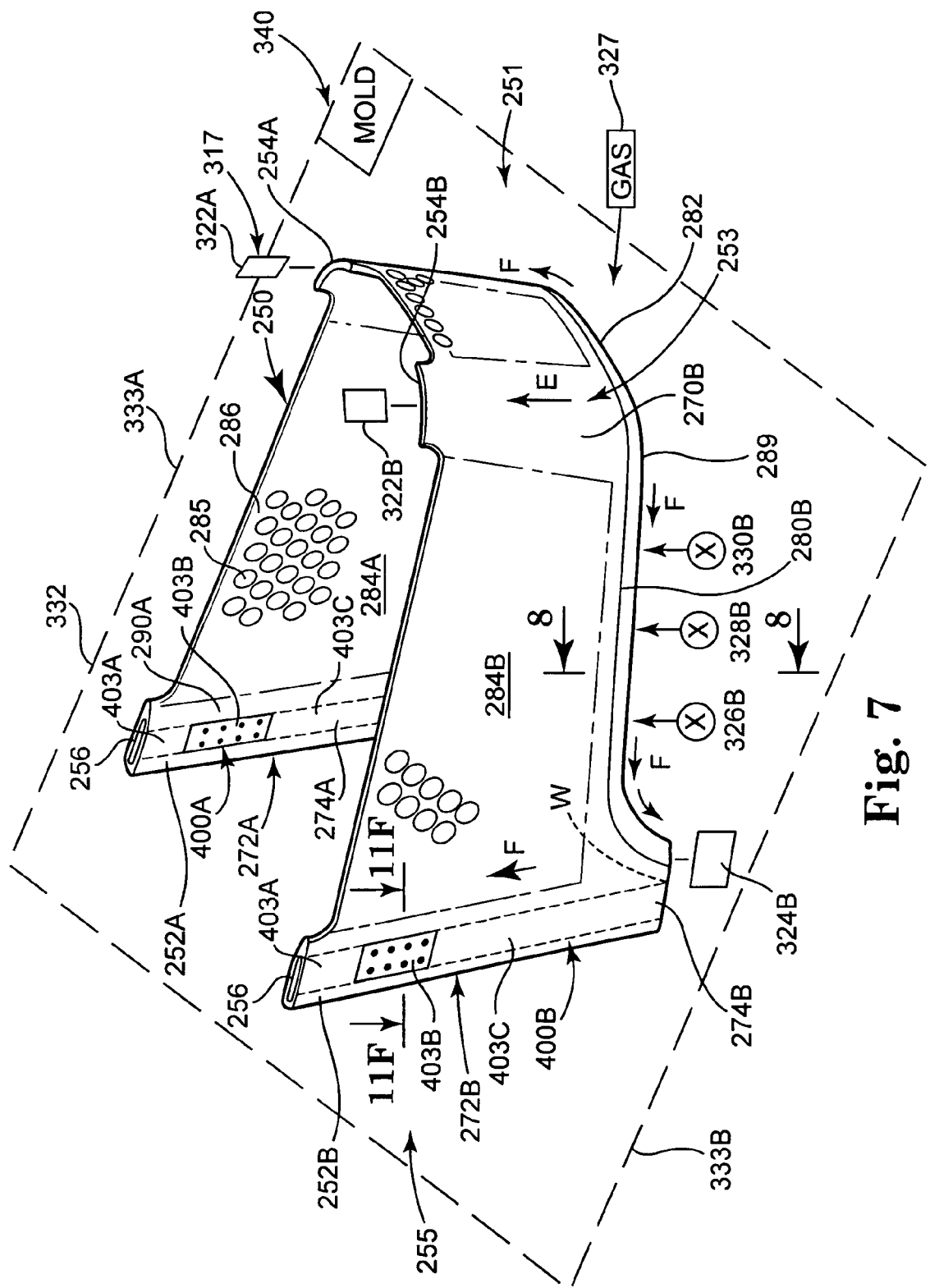
FIG. 7 is an enlarged perspective view of a basket of a shopping cart and a molding mechanism, according to an embodiment of the invention.

In one embodiment, basket 250 comprises a plurality of interconnected frame members that define a frame 253. In one aspect, frame 253 of basket 250 comprises rear upright frame members 272A, 272B, front upright frame members 270A, 270B, bottom side frame members 280A (not shown), 280B, and bottom front frame member 282 which act together to defines a box-like arrangement providing structural strength and stability to basket 250. Accordingly, as shown in FIGS. 6-7, frame 253 of basket 250 enables support of a plurality of panels 284A, 284B, 284C between respective frame members 272A, 272B, 274A, 274B, 280A, 280B, 282 of structural frame 253 of basket 250. In one aspect, panels 284A, 284B, 284C are identified in FIG. 6 by dashed lines and form a generally trapezoidal or generally rectangular shape, although panels 284A, 284B, 284C are not strictly limited to these shapes. In another aspect, panels 284A, 284B, 284C comprise a sheet 286 of material defining a pattern of holes 285. In addition, respective side bottom frame member 280A (not shown), side bottom frame member 280B, and front bottom frame member 282 of frame 253 of basket 250 also support a bottom panel 289 that defines a bottom portion of basket 250. In one aspect, bottom panel 289 comprises a member defining a pattern of holes like panels 284A-284C.

In one aspect, basket 250 is molded according to embodiments of the invention to form a unitary member in which rear upright frame members 272A, 272B, front upright front members 270A, 270B, bottom side frame members 280A, 280B, and bottom front frame member 282 extend into and blend into each other (i.e., are joined seamlessly together), and therefore do not comprise separate members connected together via fasteners. In one aspect, panels 284A, 284B, 284C, and 289 also are molded simultaneously with the respective frame members (272A, 272B, 274A, 274B, 280A, 280B, 282) as part of the same molded unitary member and therefore extend between, and are contiguous with, each respective adjacent frame member 270A, 270B, 272A, 272B, 280A, 280B, and 282 to further define this unitary member comprising basket 250.

In one embodiment, handle 100, basket 250, and/or base 300 comprise one or more structures, functions, and/or attributes as described and illustrated in pending U.S. patent applications Ser. No. 11/231,364 (titled SHOPPING CART BASKET) and Ser. No. 29/238,739 (titled SHOPPING CART), both filed Sep. 19, 2005, and both of which are hereby incorporated by reference.

In one embodiment, basket 250 is molded according to a full shot, gas-assisted plastic injection molding process. Accordingly, in one aspect, basket 250 is molded so that each respective front upright frame member 270A, 270B, rear upright frame member 272A, 272B, bottom side frame member 280A, 280B, and front bottom frame member 282 of basket 250 comprises a hollow section, thereby defining a generally tubular frame 253 of basket 250 to support panels 284A, 284B, 284C, 289. Moreover, each respective rear upright frame member 272A, 272B of basket 250 is molded to define a respective receiving slot portion 274A, 274B (e.g., a lower slot) and a respective connecting portion 252A, 252B that define slot 256 (e.g., an upper slot), as shown in FIGS. 5 and 7, to facilitate assembly of base 300 and handle 100 relative to basket 250.

As shown in FIG. 6, handle 100 is sized and shaped, and equipped with rear prongs 120A, 120B for slidable insertion and securing into the slot 256 of connecting portion 252A, 252B of rear upright frame members 272A, 272B of basket 250, as previously described in association with FIG. 5. As further shown in FIG. 6, handle 100 is also equipped with front prongs 122A, 122B for slidable insertion and securing into slot(s) of connecting portion 254A, 254B of front upright frame members 270A, 270B of basket 250, in a manner substantially the same as previously described for slot 256 of connecting portion 252A, 252B of rear upright frame members 272A, 272B as shown in FIG. 5.

As further shown in FIG. 6, base 300 is configured to support basket 250 and comprises frame 200 for supporting wheels (not shown). Base 300 comprises a unitary member including a front portion 302 and a pair of generally vertical trunks 304A, 304B and each trunk 304A, 304B comprises a prong 306A, 306B, respectively, that extends outwardly and generally vertically upward from base portion 304A, 304B. As further shown in FIG. 6, prongs 306A, 306B of base 300 are aligned for insertion into receiving portions 274A, 274B (shown in phantom) of rear upright frame members 272A, 272B of basket 250. In one aspect, receiving portions 274A, 274B of basket 250 are sized and shaped (including a length) to enable prongs 306A, 306B of base 300 to extend within a substantial length or a majority of a length of rear upright frame members 272A, 272B of basket 250 to strengthen the interconnection of basket 250 relative to base 300. Accordingly, in one aspect, prongs 306A, 306B have a length substantially the same as a slot defined by receiving portions 274A, 274B of basket 250.

In one aspect, rear upright frame members 272A, 272B have a much larger size (e.g., a greater length, width, and depth) relative to other portions (e.g., generally thin walled panels 284A-284C, 289 or other frame members 280B, 282, etc.) of the molded basket 250. Accordingly, one embodiment of the invention employs additional structures in molding basket 250 to insure that a wall thickness of basket 250 in rear upright frame members 272A, 272B (and adjacent to rear upright frame members 272A, 272B) generally corresponds to a wall thickness in other portions of the basket to achieve proper curing of the molten plastic while avoiding excess shrinkage, inadequate filling, etc. during molding of the basket 250. This additional structure, in one embodiment, comprises an insert member 400A that is inserted into a mold for basket 250 at the location corresponding to rear upright frame member 272A. Insert member 400B is inserted into the mold for the basket 250 at the location generally corresponding to rear upright frame member 272B.

In one embodiment, each insert member 400A, 400B comprises a generally sleeve-shaped member having a solid outer wall and a hollow interior, with the insert member 400A, 400B being sized and shaped to provide structural strength to rear upright frame members 272A, 272B along with other functions described throughout this application. In one aspect, insert member 400A, 400B comprises first sleeve portion 403A, generally solid midportion 403B, and second sleeve portion 403C with the generally solid midportion 403B juxtaposed between the first sleeve portion 403A and the second sleeve portion 403B. In one aspect, first sleeve portion 403A of insert member 400A, 400B generally corresponds to slot 256 and second sleeve portion 403C of insert member 400A generally corresponds to slot receiving portion 274A of a respective rear upright frame member 272A, 272B. In one aspect, generally solid midportion 403B of insert member 400A, 400B additionally comprises an array 420 of holes 422 (further illustrated in FIG. 9) formed within solid midportion 403B to facilitate mechanical interlocking of the insert member 400A relative to the remainder of the rear upright frame member 272A when the molten plastic forming rear upright frame member 272A is overmolded about insert member 400A, as further described in association with FIGS. 7-10F.

As shown in FIG. 6, midportion 403B of insert member 400A, 400B is shown in solid lines for illustrative clarity.

However, as will be understood upon reading this disclosure, both insert members 400A, 400B (including generally solid midportion 403B), become embedded in their respective rear upright frame members 272A, 272B upon overmolding the remaining structure of the respective rear upright frame members 272A, 272B about the corresponding insert members 400A, 400B and therefore insert members 400A, 400B will not be visible at the completion of the molding of basket 250. Use of insert members 400A, 400B in a method of molding a basket 250 of a shopping cart, according to one embodiment of the invention, is described in greater detail in association with FIGS. 7-10F.

FIG. 7 is a perspective view schematically illustrating molding of a basket 250 of a shopping cart via a molding mechanism 340, according to an embodiment of the invention. As shown in FIG. 7, molding mechanism 340 comprises a mold (indicated schematically by dashed lines 332) configured for molding basket 250. Although illustrated schematically in FIG. 7, mold 332 will have a geometric configuration appropriate for molding basket 250, as will be recognized by those skilled in the art upon reading this disclosure.

Basket 250 is molded in a manner substantially the same as the molding of handle 100 via gas-assisted injection molding, as previously described in association with FIGS. 2-4. However, unlike the molding of handle 100, molding mechanism 340 for molding basket 250 employs: (1) symmetrically positioned injection points (gas and/or plastic); (2) symmetrically sized and positioned plastic flow paths and gas flow paths; and (3) symmetrically sized and positioned spillover wells.

Accordingly, in one aspect, one side 333B of mold 332 of molding mechanism 340 comprises an array of plastic injection points 326B, 328B, 330B located adjacent a bottom portion 289 of basket 250 and spaced apart from each other to generally evenly distribute the molten plastic through the mold 332 to form one side of basket 250. While not shown for illustrative clarity, a substantially similar array of plastic injection points is located on an opposite side 333A of mold 332 of molding mechanism 340 for molding the other side of basket 250. In addition, molding mechanism 340 comprises an array 317 of spillover cavities including front spillover cavities 322A, 322B, and rear spillover cavities 324A, and 324B arranged about mold 332 to receive expelled molten plastic after complete filling of the mold 332 and injection of gas to form hollow sections within the basket 250. In one aspect, rear spillover cavity 324A is not shown for illustrative clarity but is arranged in a substantially similar position as rear spillover cavity 324B except on a side 333A of mold 332 generally opposite the side 333B of mold 332 at which rear spillover cavity 324B is located. As shown in FIG. 7, after complete filling of the mold 332 with molten plastic, gas is injected (via one or more gas ports 327) within mold 332 and flows generally along a first flow path (indicated by directional arrow E) and a second flow path (indicated by directional arrow F). In one aspect, the gas forms a hollow section in front upright frame members 270A, 270B, bottom side frame members 280A, 280B, and front bottom frame member 282 to provide a generally tubular frame 253 to define basket 250. However, the gas generally does not penetrate other areas of the mold 332 generally corresponding to panels 284A, 284B, 284C, and 289, leaving these areas as generally solid sections (i.e., not hollow sections). In another aspect, the injected gas generally does not penetrate rear upright frame members 272A, 272B because each respective insert member 400A, 400B generally blocks (as functionally indicated via dashed line W) the flow of gas into the region of the mold 332 that forms respective rear upright frame members 272A, 272B.

In particular, after the molten plastic completely fills mold 332 in the region of rear upright frame members 272A, 272B about insert members 400A, 400B, the plastic in that region substantially solidifies (i.e., freezes) prior to the injection of gas that occurs during the gas-assist phase of the molding process. This pre-gas solidification of rear upright frame members 272A, 272B thereby prevents the flow of gas into the region of the rear upright frame member 272A, 272B. Stated in another way, the presence of the insert members 400A, 400B in rear upright frame member 272A, 272B during the plastic flow simultaneously maintains a hollow structure (for defining slots 256, 274A in basket 250) while minimizing the volume of plastic used to form rear upright frame members 272A, 272B about insert members 400A, 400B. This arrangement, in turn, defines a wall thickness of rear upright frame members 272A, 272B about insert members 400A, 400B that generally corresponds with a wall thickness of other portions of basket 250. Maintaining a generally consistent wall thickness throughout molded basket 250, particularly in or adjacent its hollow sections, optimizes multiple quality parameters (i.e., curing, shrinkage, surface smoothness, etc) of the molded basket 250.

In another aspect, during the gas-assist phase of the molding process, the substantial formation of rear upright frame members 272A, 272B (enabled via insert members 400A, 400B) prior to gas injection generally redirects the flow of gas away from the rear upright frame members 272A, 272B to partially define the size and shape of the gas-filled channel in bottom frame member 280A, 280B of basket 250 (e.g., a first hollow section), which extends adjacent to rear upright frame members 272A, 272B.

Figure 8:
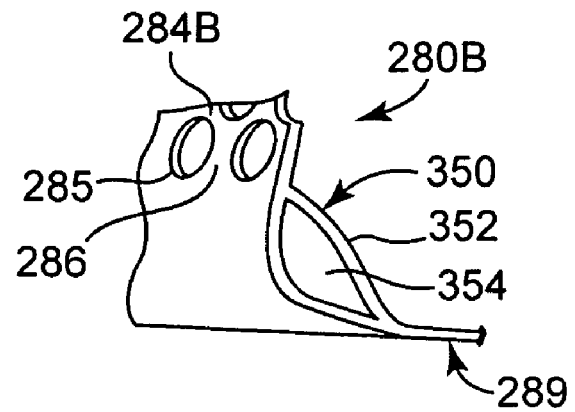
FIG. 8 is a partial sectional view of the basket as taken along line 8-8 of FIGS. 6-7, according to an embodiment of the invention.

FIG. 8 is a partial sectional view of a bottom side frame member 280B of basket 250, according to one embodiment of the invention, that illustrates a generally hollow section of basket 250 formed via the gas-assisted plastic injection molding process. In one aspect, FIG. 8 also represents a corresponding structure for frame members 270A, 270B, 280B, and 282 of basket 250. In another aspect, FIG. 8 also represents a structure generally corresponding to a hollow structure of one or more portions 102, 104, 106A, 106B of handle 100 (as previously described in association with FIGS. 2-6), except having a different cross-sectional shape than shown in FIG. 8. In another aspect, base 300 includes a generally hollow structure generally corresponding to that shown in FIG. 8, except having a different cross-sectional shape, and formed via a full shot, gas-assisted plastic injection molding process.

As shown in FIG. 8, bottom side frame member 280B of basket 250 forms a junction between side panel 284B and a bottom panel 289 of basket 250. In one embodiment, bottom side frame member 280B comprises a hollow, thin wall structure 350 including side wall 352 defining hollow channel 354. In one aspect, channel 354 is not limited to the particular shape shown in FIG. 8, but can comprise a generally circular cross-sectional shape, a generally triangular cross-sectional shape, or other shapes. In one embodiment, channel 354 is filled with a gas via gas-assisted injection, as previously described in association with FIGS. 2-7. In another embodiment, channel 354 is filled with a solid material different than the material forming side wall 352. In another embodiment, side wall 352 comprises a first plastic material including an additional material, such as a glass-type material (e.g., fiberglass strands), impregnated throughout the first plastic material to increase the strength and/or decrease the weight of side wall 352.

In one aspect, frame members 280A, 280B, 282, 270A, 270B each have a generally uniform wall thickness and a generally uniform cross sectional area.

In one aspect, handle 100, basket 250, and/or base 300 comprises a plastic material, such as a nylon material, a high density polyethylene material, or another thermoplastic material. In another aspect, in a manner substantially the same as in the molding of handle 100, a method of molding basket 250 of a shopping cart includes using additional parameters and aspects of gas-assisted plastic injection molding, as known to those skilled in the art, to accomplish a full-shot, gas-assisted plastic injection molding. In one aspect, the method of molding basket 250 employs a plastic expulsion process made available from Cinpres Gas Injection Limited of United Kingdom. In another embodiment, other injection molding systems and methods are employed for constructing the hollow, thin wall structure or for constructing non-hollow portions of base 300, basket 250, and/or handle 100. In one aspect, other employable gas-assisted molding processes include those made available from GAIN Technologies, Inc. of Michigan in the United States.

Figure 9:
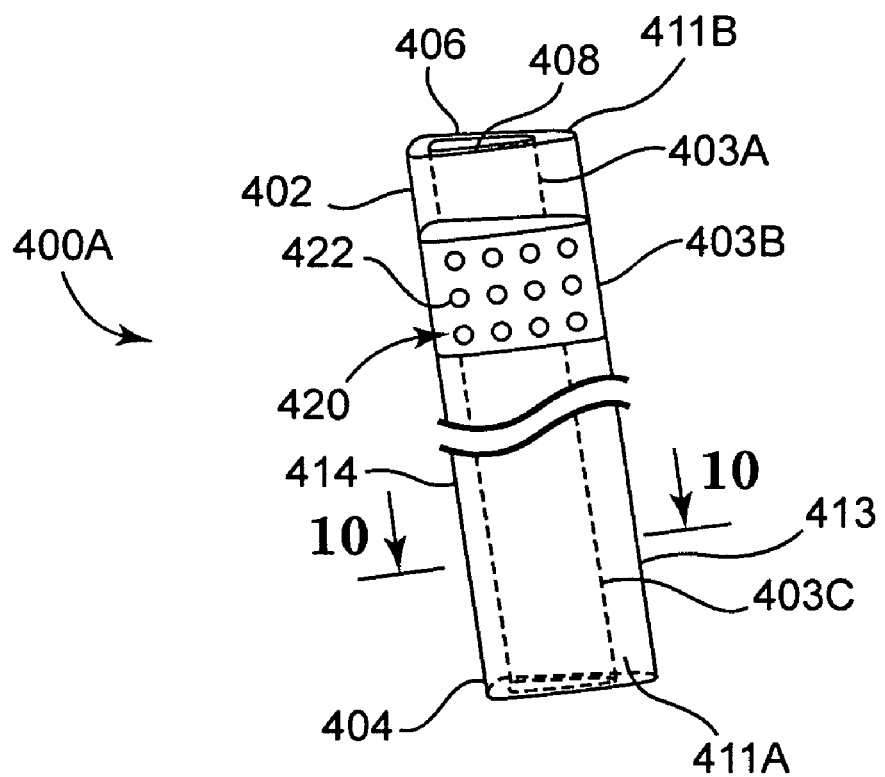
FIG. 9 is a perspective view of an insert member for molding a shopping cart component, according to an embodiment of the invention.
Figure 10A:
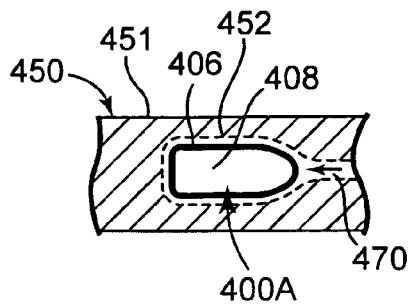
FIGS. 10A-10F are a series of sectional views of a method of molding a shopping cart component, according to an embodiment of the invention.
Figure 10B:
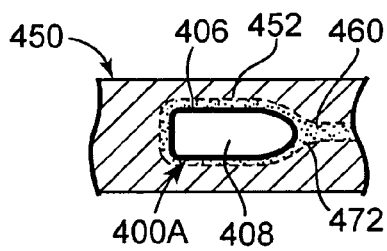
Figure 10C:
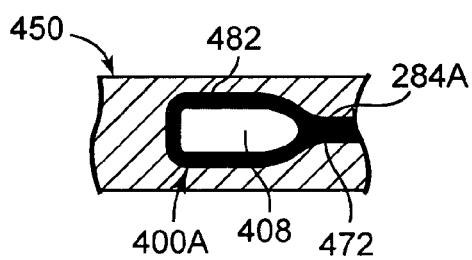
Figure 10D:
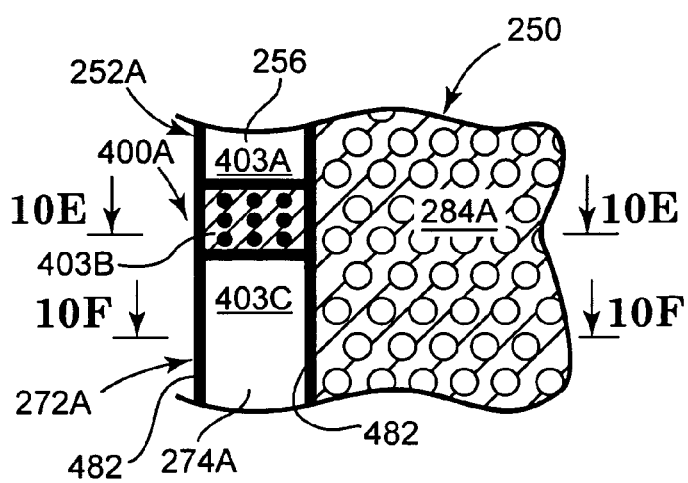
Figure 10E:
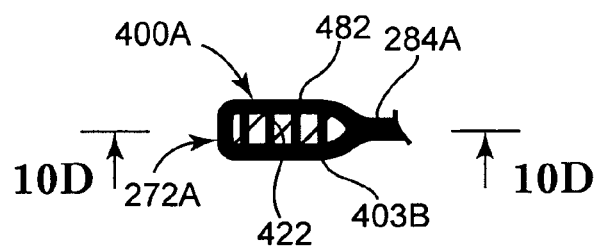
Figure 10F:
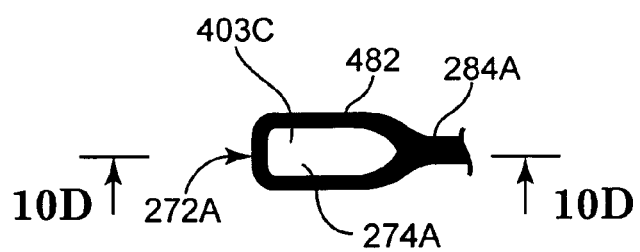

In one aspect, the filling of the molten plastic into the mold 332 to form rear upright frame members 272A, 272B of basket 250 is performed according to a method further described in association with FIGS. 9-10F.

FIG. 9 is an enlarged perspective view of insert member 400A of FIGS. 6-7, according to an embodiment of the invention. As shown in FIG. 9, insert member 400A includes a first end 402 and a second end 404 and defines a hollow structure 408 and outer wall 406. In another aspect, insert member 400A comprises a front edge portion 413, a rear edge portion 414, and opposite sides 411A, 411B. In one embodiment, insert member 400A is molded from a thermoplastic material such as a nylon material, a high density polyethylene material, or another plastic material. In one aspect, insert member 400A is provided as a subcomponent of basket 250 (FIGS. 6-7) used in molding basket 250. Insert member 400B comprises substantially the same features and attributes as plug 400A. In another aspect, as previously identified in association with FIGS. 6-7, FIG. 9 illustrates that sleeve 400A comprises first sleeve portion 403A, generally solid midportion 403B, and second sleeve portion 403C, with generally solid midportion 403B defining array 420 of holes 422.

In another aspect, array 420 of holes 422 of insert member 400A, 400B are not strictly limited to a pattern of holes but can alternatively or additionally comprise a latticework, fingers, ribs, or other structure(s) adapted to encourage mechanical interlocking of the insert member 400A, 400B relative to the remainder of the respective rear upright frame members 272A, 272B upon the overmolding of the respective rear frame members 272A, 272B of the basket 250 about the respective insert members 400A, 400B.

FIGS. 10A-10F are a series of sectional views of a method of molding a portion of a basket 250 of a shopping cart using insert members 400A, 400B, according to one embodiment of the invention. In one aspect, this method is used to mold rear upright frame member 272A, 272B of basket 250 as part of a method of molding the basket 250 as a unitary member, as previously described in association with FIGS. 6-7. In another aspect, the method can be applied to other portions of a molded basket 250 or other shopping cart component.

As shown in FIG. 10A, a mold 450 comprises a portion of the mold 332 previously described in association with FIG. 7 with mold 450 generally corresponding to a location configured for forming rear upright frame member 272A of basket 250. For illustrative purposes, this method of molding associated with FIGS. 10A-10F is described for rear upright frame member 272A of basket 250 but is understood to apply in substantially the same manner to the molding of rear upright frame member 272B of basket 250.

Accordingly, in one aspect, mold 450 includes an outer wall 451 and inner wall 452 sized and shaped corresponding to a desired shape of the rear upright frame member 272A of basket 250 with inner wall 452 defining an open chamber within mold 450. As shown in FIG. 10A, insert member 400A is placed generally centrally within the chamber defined by inner wall 452 of mold 450. With insert member 400A in this position, as indicated via directional arrow 470, an injected molten plastic enters mold 450 and flows around insert member 400A within mold 450. FIG. 10B illustrates space 460 of mold 450 being completely filled with molten plastic 472.

In another aspect, as shown in FIG. 10C, molten plastic 472 forms wall 482 along inner wall 452 of mold 450 and along outer wall 406 of insert member, until a predetermined maximum wall thickness is achieved within mold 450 about insert member 400A to thereby form rear upright frame member 272A (via overmolding about insert member 400A).

FIGS. 10D-10F are sectional views of rear upright frame member 272A after removal of basket 250 from mold portion 450 and the entire mold 332. FIG. 10D is a sectional view of a method of molding a basket, according to an embodiment of the invention, and illustrates a side view of a rear upright frame member 272A of a molded basket 250. In particular, FIG. 10D illustrates insert member 400A embedded within rear upright frame member 272A and illustrates the location of insert member 400A as molded in position to define: (1) slot 256 of connecting portion 252A of basket 250 (FIGS. 6-7) above midportion 403B of insert member 400A; and (2) slot receiving portion 274A of basket 250 below midportion 403B of insert member 400A. Accordingly, in one aspect, the upper slot (e.g. slot 256), midportion 403B of the insert member 400A, and the lower slot (e.g. receiving portion 274A) are aligned in series within rear upright frame member 272A and extend in series generally vertically alongside panel 284A of basket 250.

FIG. 10E is a sectional view as taken along lines 10E-10E of FIG. 10D that illustrates rear upright frame member 272A of basket 250 upon removal from mold 450 after overmolding rear upright frame member 272A about insert member 400A. In one aspect, FIG. 10E illustrates midportion 403B of insert member 400A which reveals the mechanical interlocking of the overmolded wall 482 and filled holes 422 of midportion 403B of the molded rear upright frame member 272A.

FIG. 10F is a sectional view as taken along lines 10F-10F of FIG. 10D and illustrates the overmolded outer wall 482 of insert member 400A that defines an outer surface of rear upright frame member 272A of basket 250 and illustrates the generally hollow sleeve portion 403C of insert member 400A that generally defines slot receiving portion 274A of rear upright frame member 272A of basket 250.

Figure 11:
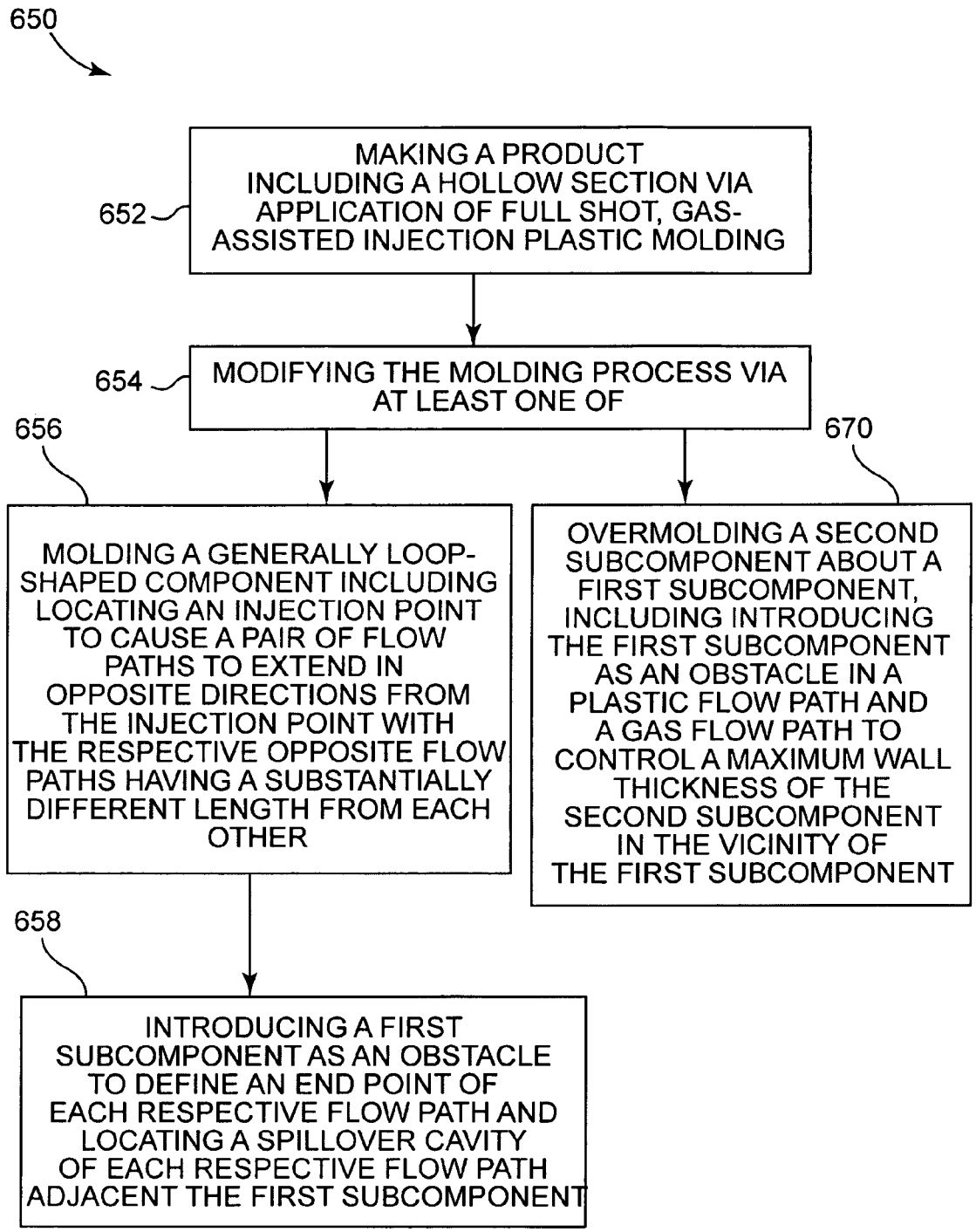
FIG. 11 is a flow diagram of a method of molding a product, according to an embodiment of the invention

FIG. 11 is a flow diagram of a method 650 of molding a product, according to an embodiment of the invention. As shown in FIG. 11, at block 652 method 650 comprises making a product that includes a hollow section via application of a full shot, gas-assisted plastic injection molding process. In one aspect, this injection molding process is a full-shot process in which the mold is completely filled with molten plastic prior to any injection of gas. Upon injection of a gas into the completely filled mold, a generally centrally axial portion of the molten plastic in the mold is expelled (via the force of gas) from the mold into a spillover well to produce a hollow section of the product. At block 654, method 10 comprises modifying the molding process.

In one embodiment, at block 670 the method 650 includes the product comprising a first subcomponent and modifying the molding process via overmolding a second subcomponent about the first subcomponent. In particular, this modification includes introducing the first subcomponent as an obstacle in a plastic flow path and in a gas flow path to control a maximum wall thickness of the second subcomponent in the vicinity of the first subcomponent. In one aspect, the method limits the wall thickness of the first hollow section from exceeding a predetermined maximum wall thickness of the product. In another aspect, the wall thickness of the first hollow section generally corresponds to a wall thickness of other hollow sections of the product. In one embodiment, method 650 at block 670 is executed according to features, attributes, and mechanisms substantially the same as those described in association with FIGS. 6-10F.

In another embodiment, at block 656 method 650 comprises molding a generally loop-shaped component to produce a generally hollow channel throughout the generally loop-shaped component. In one aspect, molding the generally loop-shaped component additionally includes locating a plastic injection point and/or a gas injection point at a "non-exposed" portion of the generally loop-shaped component. In one aspect, this "non-exposed" portion additionally generally corresponds to a portion of a product that will not be visible or exposed to the environment upon incorporation of the component into the fully assembled product.

In another embodiment, the method 650 at block 656 additionally includes locating the injection point adjacent a rear corner of the generally rectangular, loop-shaped component. In one aspect, this "rear-corner" location of the injection point(s) causes the plastic flow paths during molding to extend in opposite directions from the injection point with the oppositely oriented plastic flow paths extending substantially about the generally loop-shaped component and with an end point of each respective plastic flow path being located adjacent a front portion of the generally rectangular, loop-shaped component. Similarly, in another aspect, this "rear-corner" location of the injection point(s) causes the gas flow paths during molding to extend in opposite directions from the injection point with the oppositely oriented gas flow paths extending substantially about the generally loop-shaped component and with an end point of each respective gas flow path being located adjacent a front portion of the generally rectangular, loop-shaped component. Accordingly, in one aspect, the respective oppositely-oriented, plastic flow paths have a substantially different length relative to one another which results in a generally asymmetric plastic flow path and the respective oppositely-oriented, gas flow paths have a substantially different length relative to one another which results in a generally asymmetric gas flow path for the molding process.

In another embodiment, at block 658 method 650 comprises additionally introducing a first subcomponent (e.g., a plug) as an obstacle to define the end point of each respective plastic flow path and gas flow path, and to define a location of a spillover well for each respective plastic flow path and gas flow path. In other words, the end point of each respective plastic flow path and gas flow path generally corresponds to a location of a spillover well configured to receive molten plastic expelled via the gas flow. In one aspect, the spillover well is located adjacent the front portion of the generally rectangular, loop-shaped component to be at a generally opposite end of the molded generally loop-shaped component relative to the injection points of the plastic flow paths and the gas flow paths.

In one embodiment, method 650 at blocks 656-658 is executed according to features, attributes, and mechanisms substantially the same as those described in association with FIGS. 2-6.

Embodiments of the invention enable effective molding of a component having a hollow section via application of an insert member. The insert member is configured to act as a strategic obstacle to direct plastic flow paths and/or gas flow paths during a full shot, gas-assisted plastic injection molding process and also enables overmolding of a component about the insert member.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of molding a shopping cart component comprising:
   providing a first subcomponent; and
   forming the shopping cart component, via overmolding a molten plastic completely around the first subcomponent within a mold, by introducing the first subcomponent as an obstacle within the mold to partially define a first hollow section of the shopping cart component adjacent the first subcomponent.

2. The method of claim 1, wherein the first subcomponent is completely retained within the molten plastic.

3. The method of claim 1 wherein forming the shopping cart component comprises:
   completely filling the mold via injection of the molten plastic into the mold via at least one plastic injection port with the molten plastic flowing completely around the first subcomponent and engaging a portion of the first subcomponent;
   injecting a gas into the molten plastic in the mold through at least one gas injection nozzle to forcibly push a portion of the molten plastic out of the mold, via at least one spillover well, to form the first hollow section of the shopping cart component adjacent to the first subcomponent; and
   removing the molded shopping cart component from the mold.

4. The method of claim 3 wherein injecting the gas further comprises:
   forming a second hollow section of the shopping cart component with the second hollow section being spaced apart from the first hollow section, the second hollow section comprising a generally uniform wall thickness and a generally uniform cross-sectional area, and wherein the first hollow section of the shopping cart component comprises a generally non-uniform cross-sectional area.

5. The method of claim 4 wherein providing the first subcomponent comprises:
   arranging the first subcomponent to be sized and shaped to cause the first hollow section of the shopping cart component, during the overmolding of the molten plastic relative to the first subcomponent, to limit a wall thickness of the first hollow section from exceeding a predetermined maximum wall thickness of the shopping cart component.

6. The method of claim 5 wherein the wall thickness of the first hollow section generally corresponds to the wall thickness of the second hollow section of the shopping cart component.

7. The method of claim 5 wherein forming the shopping cart component comprises:
molding the shopping cart component as an all-plastic basket of a shopping cart, including:
arranging the basket to define a goods-receptacle that includes a front portion and rear portion;
positioning the first subcomponent within the mold, during the overmolding of the molten plastic relative to the first subcomponent, for location within a rear upright frame member of the basket adjacent the rear portion of the basket with the rear upright frame member defining the first hollow section.

8. The method of claim 7 wherein positioning the first subcomponent comprises:
providing the first subcomponent as an insert member that includes:
a first sleeve portion defining an upper slot of the rear upright frame member of the basket;
a second sleeve portion defining a lower slot of the rear upright frame member of the basket; and
a generally solid midportion extending between the first sleeve portion and the second sleeve portion.

9. The method of claim 8 wherein the insert member has a length substantially the same as a length of the rear upright frame member, and wherein the insert member extends generally vertically alongside a side panel of the basket.

10. The method of claim 3 wherein forming the shopping cart component further comprises:
forming the shopping cart component as a generally loop-shaped handle of a shopping cart and providing the first subcomponent as a generally cylindrically shaped plug;
arranging the generally loop-shaped handle to include a front portion and a rear portion and locating the at least one plastic injection port and the at least one gas injection nozzle adjacent the rear portion of the generally loop-shaped handle at the mold and locating the plug at the front portion of the generally loop-shaped handle.

11. A method of molding a handle of a shopping cart, the method comprising:
providing a mold shaped to produce a generally loop-shaped handle, the handle including at least one rear corner portion and a front portion, the front portion located at a generally opposite end of the handle relative to the at least one rear corner portion;
injecting a molten plastic via a plastic injection port, adjacent the at least one rear corner portion of the handle, to flow along a first plastic flow path and a second plastic flow path within the mold until the mold is completely filled with the molten plastic, wherein the first plastic flow path extends in a generally opposite direction from the second plastic flow path;
injecting a gas via a gas injection nozzle, adjacent the at least one rear corner portion of the handle, to flow along a first gas flow path and a second gas flow path into the molten plastic within the completely filled mold to forcibly push a portion of the molten plastic out of the mold, into at least one spillover well located adjacent the front portion of the handle, to form a hollow structure of the handle, wherein the first gas flow path extends in a generally opposite direction from the second plastic flow path; and
removing the generally loop-shaped handle from the mold, wherein injecting the molten plastic comprises:
placing, prior to injecting the molten plastic, a plug entirely within the mold at the front portion of the handle to cause overmolding of the plug such that the plug is entirely embedded within the front portion of the handle, wherein the plug defines an end portion of each respective first plastic flow path, second plastic flow path, first gas flow path, and second gas flow path of the mold.

12. The method of claim 11 wherein injecting the molten plastic further comprises:
arranging the plug with a size and a shape to substantially block flow of the molten plastic between the first plastic flow path and the second plastic flow path at the front portion of the handle.

13. The method of claim 12 wherein arranging the plug comprises:
providing at least one ribbed portion on the plug to induce flow of the molten plastic into the at least one ribbed portion of the plug to cause mechanically locking the plug relative to the molten plastic.

14. The method of claim 12 wherein providing the mold comprises:
arranging the at least rear corner portion of the handle to define a prong of the handle, wherein the prong comprises at least one of the plastic injection port and the gas injection port; and
concealing both of the plastic injection port and the gas injection port on the prong via slidably insertion and securing the prong into a slot of a basket of the shopping cart.

15. The method of claim 12 wherein injecting the gas comprises:
providing the at least one spillover well as a first spillover well and a second spillover well;
positioning the first spillover well adjacent the end portion of the first gas flow path and the second spillover well adjacent the end portion of the second gas flow path, with the second spillover well being substantially larger than the first spillover well.

16. The method of claim 15 wherein the second plastic flow path is substantially longer than the first plastic flow path and the second gas flow path is substantially longer than the first gas flow path.

17. A method of molding an all-plastic shopping cart comprising:
forming a generally hollow handle of the shopping cart within a first mold via a full shot, gas-assisted plastic injection molding process;
forming a basket of the shopping cart within a second mold via a full shot, gas-assisted plastic injection molding process, the basket including at least one hollow section;
forming a generally hollow base of the shopping cart within a third mold via a full shot, gas-assisted plastic injection molding process; and
assembling the shopping cart via removably attaching the handle to the basket and via removably attaching the base to the basket;
wherein forming the handle comprises:
arranging the first mold to include a pair of generally oppositely oriented plastic flow paths and a pair of generally oppositely oriented gas flow paths,
arranging the first mold to produce the handle as a generally loop-shaped member and introducing a plug completely within the first mold between the generally oppositely oriented plastic flow paths to terminate flow of the molten plastic from the respective plastic flow paths and between the generally oppositely oriented gas flow paths to terminate flow of the gas from the respective gas flow paths, and locating a spillover well adjacent each respective plastic flow path.

18. The method of claim 17 wherein forming the basket comprises:

arranging the second mold to produce the at least one hollow section of the basket, including introducing an insert member as an obstacle within a plastic flow path and a gas flow path of the second mold to cause molten plastic within the mold to form the at least one hollow section as a first hollow section adjacent to and extending from the plug.

19. A method of molding a product comprising:

providing a first subcomponent; and forming the product, via gas-assisted, plastic injection overmolding of a molten plastic about the first subcomponent within a mold, including positioning the first subcomponent within the mold to direct a gas flow path within the mold to partially define a first, gas-filled hollow section of the product defining an open space directly abutting the first subcomponent; and removing the product from the mold.

20. The method of claim 19 wherein forming the product comprises:

providing the mold with a first shape configured to produce a generally loop-shaped product, the product including a first portion and a second portion, the second portion located at a generally opposite end of the product relative to the first portion;

providing the first subcomponent as a solid insert member and positioning the solid insert member within the mold adjacent the second portion of the product; and the gas-assisted plastic injection molding process includes:

injecting the molten plastic, adjacent the first portion of the mold, within the mold to completely fill the mold with the molten plastic with the solid insert member defining an end point of a plastic flow path within the mold; and injecting the gas, adjacent the first portion of the product, to forcibly expel a portion of the molten plastic out of the mold into at least one spillover well with the solid insert member positioned adjacent the at least one spillover well to cause the expelled portion to exit the mold into the at least one spillover well.

21. The method of claim 19, further comprising:

inserting the first subcomponent within the mold prior to forming the product such that the molten plastic completely surrounds the first subcomponent during plastic injection overmolding.

\* \* \* \* \*